United States Patent Office 2,807,784
Patented Sept. 24, 1957

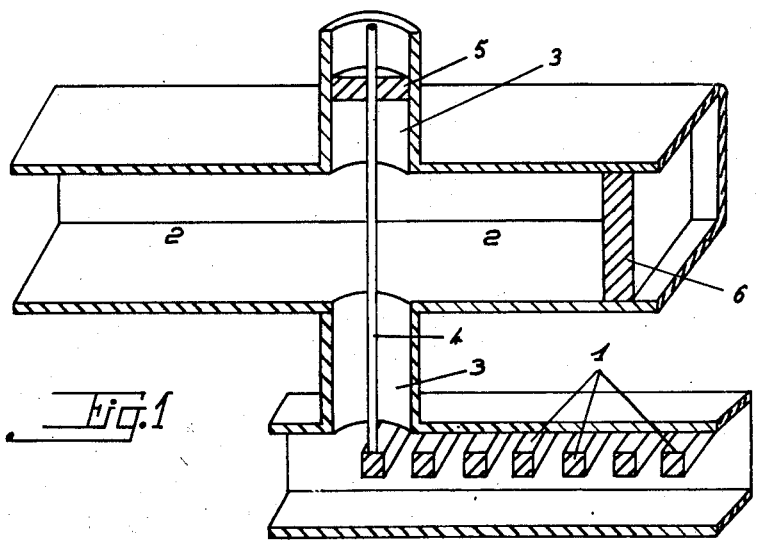
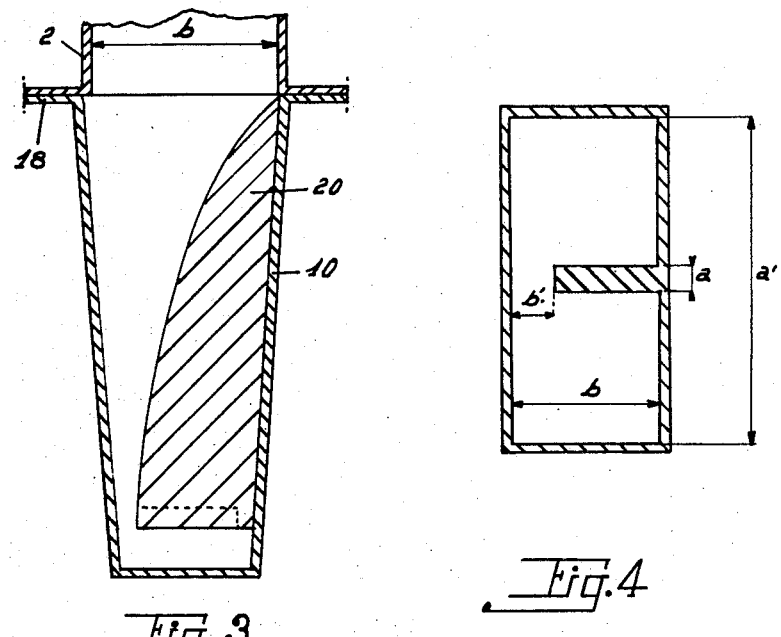

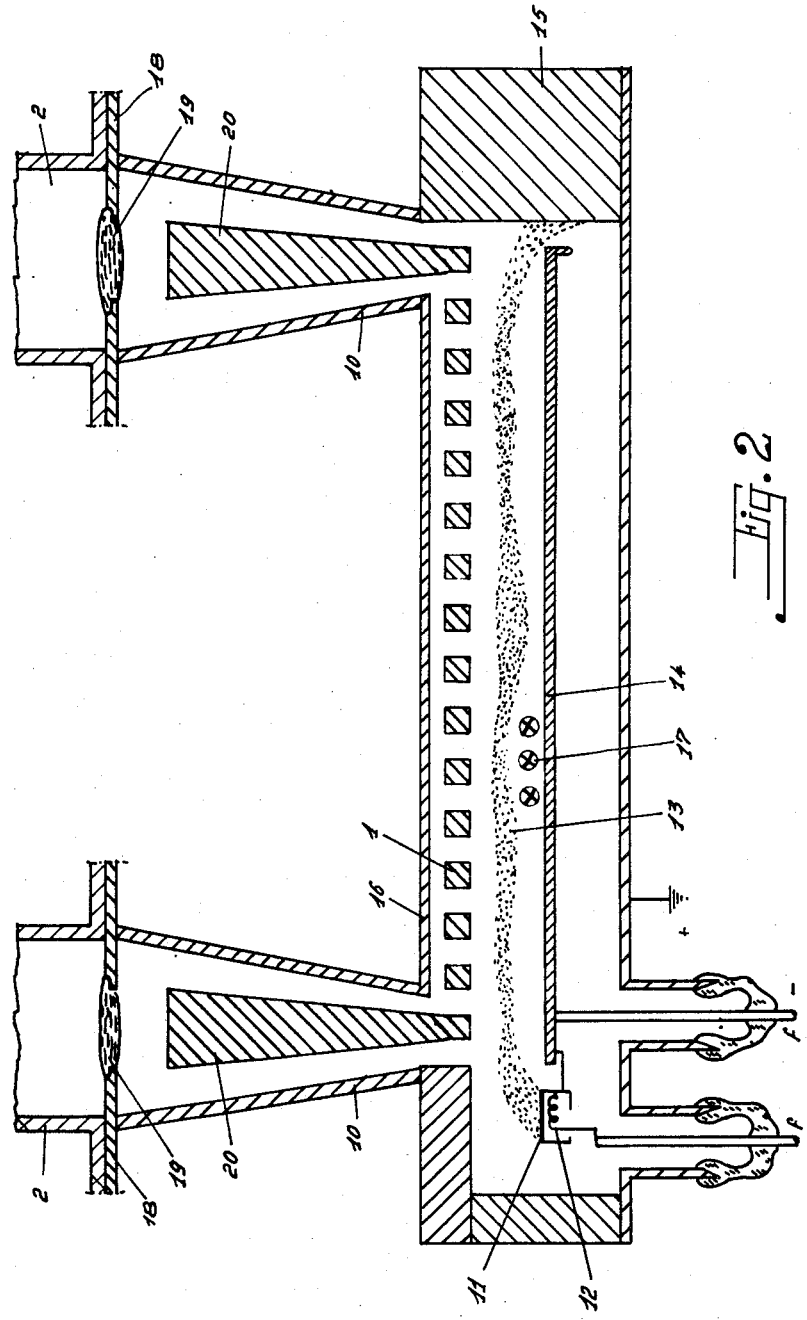

2,807,784

COUPLING AND MATCHING DEVICE FOR EXTERNAL CIRCUITS OF A TRAVELING WAVE TUBE

Alfred Lerbs, Paris, France, assignor to Compagnie Generale de Telegraphie Sans Fil, a corporation of France Application March 11, 1953, Serial No. 341,783

Claims priority, application France March 17, 1952

6 Claims. (Cl. 333—31)

Travelling wave tubes for amplifying or for oscillating on a wide decimetric or centimetric wave band are known. In high-power tubes, and in particular in tubes having crossed electric and magnetic fields, there is employed as a delay line, a line having a geometrically periodical structure, such as an interdigital or vane type line, the two ends (input and output ends) of which are connected to the external circuits of the tube through a coupling system, which is preferably such that the band width is as great as possible.

The present invention has for its object to improve the band width and the protection against breakdown in a coupling device between a guide and a line of periodical structure.

Up to the present, such a coupling has been effected through a co-axial line, the inner conductor of which is secured at one of its ends to the first element of the delay line in the case of the input coupling, or to the last element in the case of the output coupling. The other end of the inner conductor extends through the guide, and pistons may be provided to permit of adjusting the matching.

This system has a number of disadvantages: In the first place, matching on a large band width is difficult to effect. In the second place, it is possible that in high-power tubes operating continuously, or in tubes having a high crest power and operating by impulses, breakdown may occur in the co-axial line, especially in the case of mismatching producing standing waves along the co-axial line.

In accordance with the present invention, in which these difficulties are avoided, there is disposed between the input or output end (or both) of a line having a periodic structure in a travelling wave tube and the guide in which the high-frequency energy circulates, a horn-shaped coupling and matching device, the internal section of which is narrowed by at least one suitably profiled plate, so that the form of the plate, as seen from the end, is progressively modified to a form resembling that of the element of the line with which the guide is to be coupled the said plate being so shaped and positioned that its extremity resembles a periodically repeated element of the line and is aligned with the delay line and occupies in the space a location corresponding to an extension of the geometrically periodical structure thereof, and that the characteristic impedance of the guide is converted to a value equal to or similar to that of the line.

In the accompanying drawings:

Fig. 1 is a perspective view, with parts broken away, of a known coupling device;

Fig. 2 is a longitudinal section through a travelling wave tube having an improved coupling device in accordance with the present invention;

Fig. 3 is a transverse section on line 3—3 of Fig. 2;

Fig. 4 is a cross-section on line 4—4 of Fig. 3;

Figure 6:
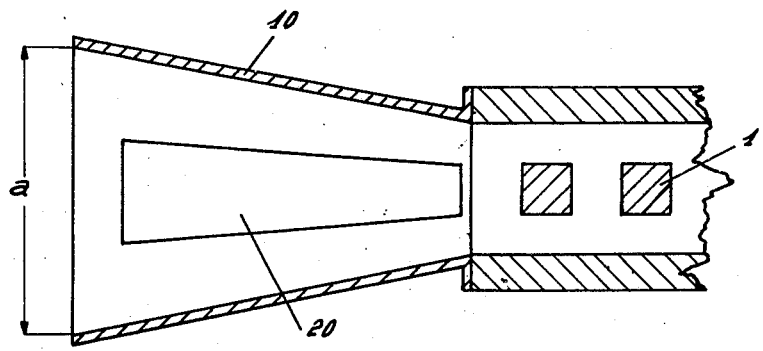
Figure 7:
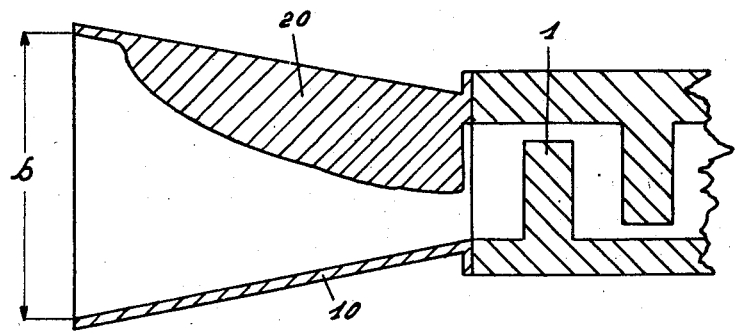
Figure 8:
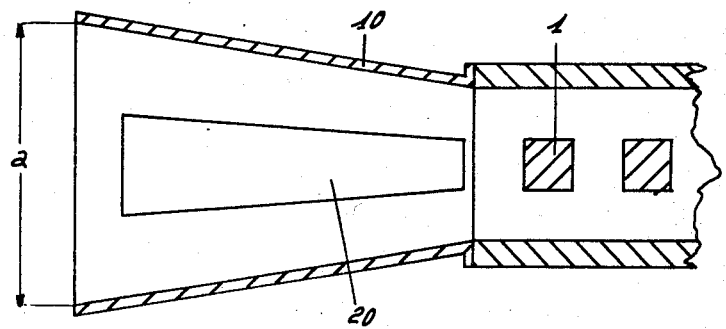
Figure 9:
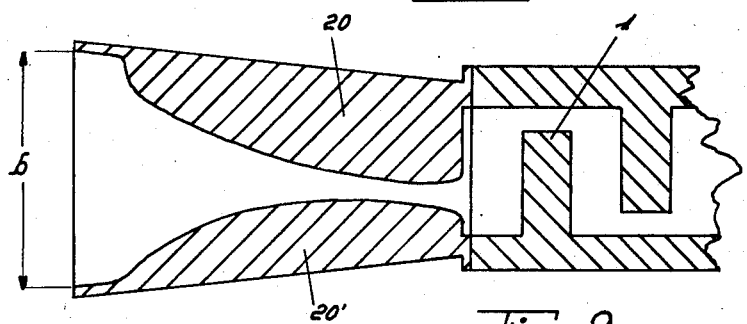
Figure 10:
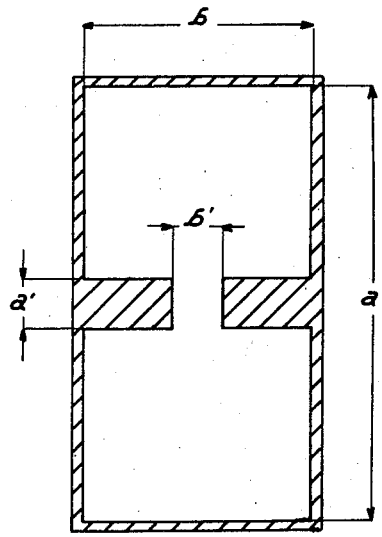
Figure 11:
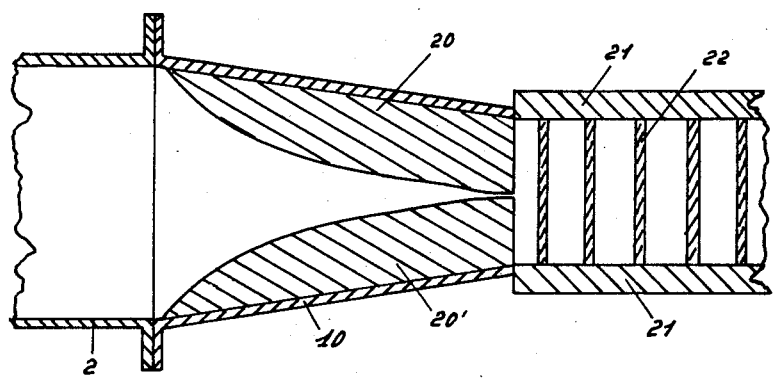
Figure 12:
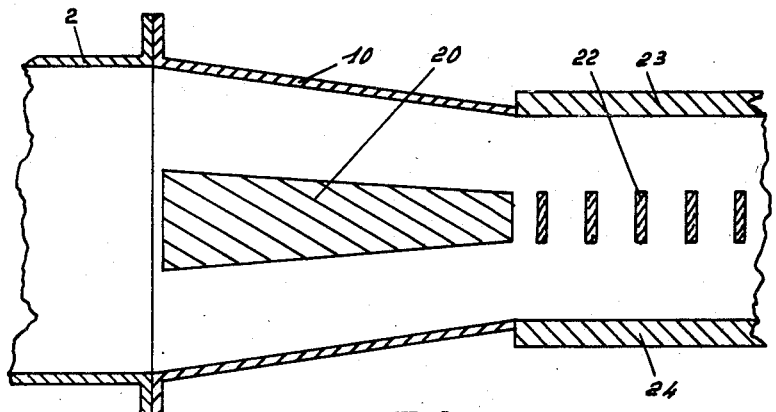
Figure 13:
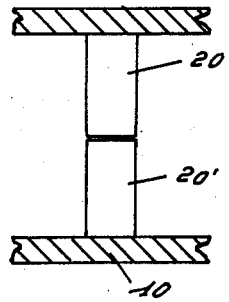

Figs. 6 and 7 are views similar to Figs. 2 and 3 of a modified form of coupling device, Fig. 7 being taken on line 7—7 of Fig. 6;

Figs. 8, 9 and 10 are views similar to Figs. 2, 3 and 4 of a further modified form, Fig. 9 being taken on line 9—9 of Fig. 8 and Fig. 10 on line 10—10 of Fig. 9; and Figs. 11, 12 and 13 are views similar to Figs. 2, 3 and 4 of a still further modified form, Fig. 11 being taken on line 11—11 of Fig. 12 and Fig. 13 on line 13—13 of Fig. 11.

In the known coupling device of Fig. 1, the delay line 1, for example of interdigital form, is coupled to a wave guide 2 by a coaxial line 3, the inner conductor 4 of which is secured at one of its ends to the proximate end finger of the line 1. At its other end, the conductor 4 is provided with a piston 5 sliding in a tuning stub constituted by the outer conductor. The guide 2 is closed at one end by a tuning piston 6.

The invention will be more readily understood by reference to Figure 2, which shows by way of example a tube of straight form and having crossed electric and magnetic fields and in which an interdigital line 1 is used as the line of periodical structure. The tube comprises in the usual manner a cathode 11 heated by a filament 12 and emitting an electron beam 13 which is propagated in a direction parallel to the line 1, between the latter and an electrode 14 brought to a negative voltage in relation to 1. At the end of the travel, the beam is caught by a collector 15. The whole assembly is housed in an envelope 16 brought to the same potential as the line 1, which may be zero potential, by earthing. The space between 1 and 14 is traversed by a magnetic field perpendicular to the drawing, the lines of force of which have been indicated at 17 and the strength and direction of which will be determined by the known laws concerning the operation of tubes having crossed electric and magnetic fields.

In accordance with the invention, each end of the line 1 is coupled with a horn-shaped element 10 terminated by a flange 18 closed by an insulating window 19 and intended to be secured to a wave guide 2 of rectangular cross-section, the internal dimensions of which are the same as those of the aperture of the horn-shaped element. Disposed within the horn-shaped element is a plate 20 joined to the first finger of the line 1 and profiled as indicated by the section of Figure 3, perpendicular to the plane of Figure 1. The internal dimensions of the rectangular section of the horn decrease progressively in the direction of the line 1, and the dimensions of the spaces between the walls of the horn and the plate 20 are finally reduced to the length and the width of the space between the fingers of the interdigital line, the plate, as seen from the end, having the form of the said finger. At the same time, by reason of the profile of the member 20 as shown in Figure 3, the impedance of the guide is progressively brought to the value corresponding to the matching of the delay line.

In order that the operation of the described system may be understood, reference will be made to Figure 4, in which there is shown the cross-section of the horn 20 at any point through the plane perpendicular to the planes of Figures 2 and 3, for example at line 4—4 of Figure 3. The dimensions of the cross-section are: $a$=longer side, and $b$=shorter side of the rectangle, $a'$=thickness of the plate 20, and $b'$=its distance from the opposite wall. It is known that the cut-off wave in the free space of a rectangular guide is $\lambda_c=2a$, and that this wave can be increased at the same time as the characteristic impedance $Z$ is reduced, if one or both plates are secured on the longer side of the guide.

The increase of $\lambda_c$ is more pronounced in proportion as the ratio $b':b$ is lower. On the other hand, for a given value of $b':b$ (and in particular for a value of this ratio between 0.3 and 0.7, a change of the ratio $a':a$ only slightly influences the value $\lambda_c$, but acts strongly on the characteristic impedance Z. In terms of the equivalent self-inductance L and capacitance C of the distributed constants of the guide, the ratio $b':b$ determines principally the product LC, and the ratio $a':a$ determines principally the ratio L:C. By varying the four dimensions indicated, it is thus possible to produce the desired values of $\lambda_c$ and Z within wide limits independently of the given values of $a$ and $b$.

Figure 5:
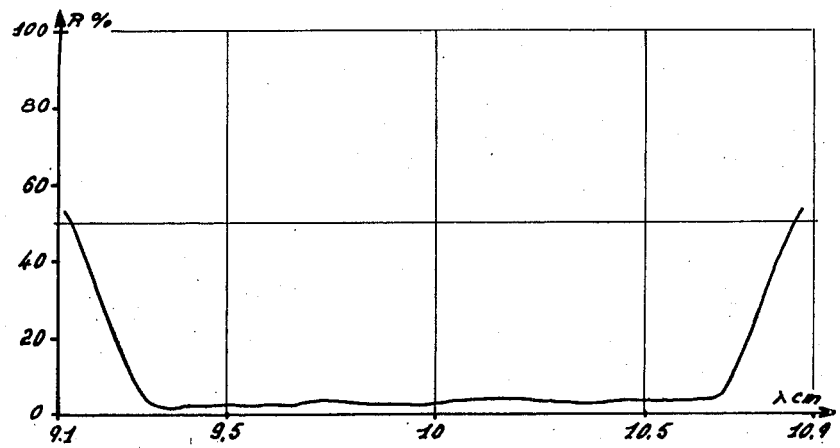
Fig. 5 is an explanatory graph.

The effectiveness of the invention is verified by the curve plotted in the course of a practical test as reproduced in Figure 5, which gives the power reflected as a function of wave-length for the device of Figure 2. The coefficient of reflection R was plotted in percent along the ordinates, and the wavelength in cm. was plotted along the abscissae. It will be seen that the reflection is practically zero between 9.3 and 10.6 c., that is to say, the correct matching band is about 13% of the mean wavelength.

In practice, when the length and the longitudinal profile of the horn have been chosen, the form of the plates will be so chosen that in each cross-section of the horn the cut-off wave of the horn is constant and equal to the cut-off wave of the guide, and that the rate of change of the characteristic impedance along the horn is constant.

It is not necessary for the position of the horn in relation to the line to be as shown in Figure 2, but the line may be acted on at the end as illustrated in Figures 6 and 7 along two perpendicular longitudinal sections. In this case, the ridge 20 will be fixed to the wall of the horn 10 which is opposite the stub 1 supporting the first finger coupled with the horn. It will obviously be possible, if required, to choose other directions of impingement on the line by the horn.

Figures 8 and 9 show two longitudinal sections corresponding to Figures 6 and 7, and Figure 10 shows a transverse section through a horn in which two ridges 20, 20' have been secured, the dimensioning being determined by the same general rules as in the foregoing.

The principles set out are obviously valid for a circular form of line of periodical structure.

The invention is not limited to coupling with an interdigital line, but is also applicable to any line, the principle indicated being absolutely general. It will be recalled here that this principle consists in disposing between the guide and the line a horn shaped element having at least one ridge in its interior, the profile of the ridge being such that its transverse section resembles, at its end, the neighbouring element of the coupled line, this extremity of said ridge being positioned as a spatial continuation of said line, and that the high-frequency field has at this end approximately the same form and the same intensity as the element of the line to which it is connected.

Thus, Figures 11 and 12 show the coupling between a guide 2 and a "ladder-form" line. This line is composed of two uprights 21 with transverse bars 22, the whole being disposed between two plates 23, 24. There is provided between the guide 2 and the line a horn shaped element 10 comprising in its interior two profiled symmetrical plates 20, 20', which are separated only by a very small gap on the side nearer the line, and may even be contiguous. The assembly comprising these plates, as seen in end view from the line (Figure 13), is of substantially the same form as the bar 22, and is positioned in the plane of the ladder, whereby said bar-like extremity is located in the site of the next step of the ladder.

The invention is not limited to the examples which have been described, but permits of all modifications within the ability of one skilled in the art. The matching according to the same principle could be effected in the case of vane-type lines or lines of periodical structure having the form of a symmetrical solid of revolution about an axis having the same direction as the propagation of the travelling wave. The invention could also be applied in the case of guides operating on a propagation mode other than the main mode. All these modifications remain within the limits of the general underlying idea of the invention.

What I claim is:

1. In combination, a travelling wave tube comprising a delay line of geometrically periodical structure having delay elements, the projection of each element on a plane passing through the axis of the line being a rectangle whose transversal and longitudinal dimensions are in a predetermined ratio, a rectangular wave guide outside the said tube, said wave-guide having a ratio of transversal to longitudinal dimensions, different from said first mentioned ratio, a horn-shaped coupling device opening on one side into said guide and on the other side into said tube, at least one plate of a profile progressively narrowing the internal cross-section of said horn-shaped device, thereby progressively matching the impedance of said guide to the impedance of said delay line, said plate being secured longitudinally by its edge to an inner wall of said horn-shaped device and extending inside the said tube with its extremity in alignment with said delay line, the said extremity as seen in an end view being of the same shape as one of the periodical element of said line, and said plate being spatially positioned to occupy by its extremity the spatial location of an element of said geometrically periodical structure.

2. The combination as claimed in claim 1, wherein the said plate is of variable thickness along the axis of said horn-shaped device.

3. The combination as claimed in claim 1, wherein an inner wall of the horn-shaped element supports a single profiled plate, the plane of which extends parallel to the axis of the horn-shaped element.

4. The combination as claimed in claim 1, wherein the opposite inner walls of the horn-shaped element support two profiled plates, the planes of which are coincident and extend parallel to the axis of the horn-shaped element.

5. The combination as claimed in claim 1, wherein the line is of the interdigital type and the guide is of rectangular section.

6. The combination as claimed in claim 1, wherein the line is of the ladder-form type and the guide is of rectangular section.

References Cited in the file of this patent

UNITED STATES PATENTS

| | | |
|---|---|---|
| 2,409,913 | Tonks | Oct. 26, 1946 |
| 2,555,349 | Litton | June 5, 1951 |
| 2,567,748 | White | Sept. 11, 1951 |
| 2,633,493 | Cohn | Mar. 31, 1953 |
| 2,643,353 | Dewey | June 23, 1953 |
| 2,645,737 | Field | July 14, 1953 |
| 2,711,517 | Krutter | June 21, 1955 |
| 2,736,866 | Clavier | Feb. 28, 1956 |

OTHER REFERENCES

Ragan: Microwave Transmission Circuits, vol. 9, M. I. T. Radiation Lab. Series, McGraw-Hill, 1948, pages 358–61.